(12) United States Patent
Kreinbrink et al.

(10) Patent No.: US 9,032,238 B2
(45) Date of Patent: May 12, 2015

(54) SYSTEMS AND METHODS FOR CROSSOVER DELAY TO PREVENT POWER MODULE FAULTS (75) Inventors: Joseph V. Kreinbrink, Euclid, OH (US); Joseph S. Klak, Jr., Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 954 days.

(21) Appl. No.: 13/174,104

(22) Filed: Jun. 30, 2011

(65) Prior Publication Data
US 2013/0002330 A1  Jan. 3, 2013

(51) Int. Cl.
*G06F 1/00* (2006.01)
*H02M 1/08* (2006.01)
*H02M 1/38* (2007.01)

(52) U.S. Cl.
CPC . *H02M 1/08* (2013.01); *H02M 1/38* (2013.01)

(58) Field of Classification Search
USPC .................. 713/1, 2, 100, 300, 400, 500, 600
See application file for complete search history.

(56) References Cited

U.S. PATENT DOCUMENTS

| | | | | |
|---|---|---|---|---|
| RE33,848 E | * | 3/1992 | Shiraishi | 318/444 |
| 7,034,501 B1 | * | 4/2006 | Thunes et al. | 318/812 |
| 7,352,836 B1 | * | 4/2008 | Mendenhall | 375/372 |
| 2007/0138990 A1 | * | 6/2007 | Lewis et al. | 318/274 |
| 2008/0168293 A1 | * | 7/2008 | Allen et al. | 713/400 |
| 2009/0040649 A1 | * | 2/2009 | Loew et al. | 360/72.3 |

* cited by examiner

*Primary Examiner* — Kim Huynh
*Assistant Examiner* — Paul J Yen
(74) *Attorney, Agent, or Firm* — Quarles & Brady LLP (57) ABSTRACT Systems and methods detect when a transition from a first power module to a second power module is taking place and generates a lockout pulse when the transition is detected. The lockout pulse initiates the blocking of a predetermined number of gate pulses from reaching the second power module. When the predetermined number of gate pulses are blocked, the systems and methods reset to allow complete gate pulses to reach the second module, and continues to detect when the next transition takes place.

18 Claims, 12 Drawing Sheets

SYSTEMS AND METHODS FOR CROSSOVER DELAY TO PREVENT POWER MODULE FAULTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The subject matter disclosed herein relates generally to preventing a fault in a DC drive power module, and, more particularly, to preventing a fault in a power module by inserting a crossover delay in a transition from forward to reverse and reverse to forward.

On DC drives, it is not uncommon to have fault problems related to power module gating (switching) at the transition between forward to reverse and reverse to forward. Problems with power module switching between forward to reverse and reverse to forward can be an issue at any size, but it is more prevalent in high horsepower systems and can become even more of a issue when a DC drive system is retrofit. A typical DC drive retrofit is where the power components, including transformers, motors, and power modules, remain in place, and the regulator is replaced with a new or updated regulator that provides improved command and control of the power components. However, newer, more modern regulators typically provide faster switching of the power module gates. With this faster switching provided by newer regulators, one of the forward or reverse power modules does not always have sufficient time to recover (completely turn off) before the opposite power module (the other of forward or reverse) is commanded to turn on. Larger power modules also typically require more recovery time.

A power module fault of this type is generally caused by "shoot through" currents between the forward and reverse power modules at the transition from forward to reverse and at the transition from reverse to forward. The power module that is being transitioned from does not fully turn off before the other power module is turned on. This problem can occur in power module configurations that include a transition between one or more power modules.

Known configurations attempting to address the shoot through problem simply insert a fixed time delay at the power module transition. However, this configuration presents a problem of its own because gate pulses to the power module can shift in time due to the regulator firing angle changes, which are a part of normal closed loop regulation. This presents the problem of re-enabling gate pulses to a power module at the end of the time delay yet in the middle of a gate pulse pattern, which could result in damage to the power module.

It would, therefore, be desirable to add a crossover delay at the transition point that would block the forward and/or reverse power module gate pulses to provide sufficient time for one power module to turn off prior to the next power module being commanded to turn on.

BRIEF DESCRIPTION OF THE INVENTION

The present embodiments overcomes the aforementioned problems by providing a crossover delay. The crossover delay provides a "dead time" where power module gate pulses are blocked and no gate pulses are allowed to the forward or reverse power modules when a transition from forward to reverse or reverse to forward occurs. This allows the power module(s) enough time to recover and to go into an off state. The stream of forward and reverse gate pulses are processed to generate the desired blocking of the gate pulses.

In accordance with one embodiment of the invention, a crossover delay system is disclosed for blocking gate pulses when a transition from a first power module to a second power module is taking place. The system comprises a crossover detection hardware and/or software configuration for detecting when the transition from the first power module to the second power module is taking place and generating a crossover detection pulse when the transition is detected. A lockout hardware and/or software configuration receives the crossover detection pulse from the crossover detection means, and generates a lockout signal to block a predetermined number of gate pulses from reaching the second power module. A pulse counter hardware and/or software configuration counts a number of gate pulses intended for the second power module, and compares the number of gate pulses to the predetermined number of gate pulses.

In accordance with another embodiment of the invention, methods are disclosed for blocking gate pulses to power modules. The methods comprise detecting when a transition from a first power module to a second power module is taking place; generating a lockout pulse when the transition is detected; and blocking a predetermined number of gate pulses from reaching the second power module.

In accordance with yet another embodiment of the invention, a computer usable medium and a computer readable code embodied on the computer usable medium is disclosed for use with a motor drive system that includes at least a first power module and a second power module. The computer readable code comprises a crossover detection program code configured to detect when the transition from the first power module to the second power module is taking place and to generate a crossover detection pulse when the transition is detected. A lockout program code is configured to receive the crossover detection pulse from the crossover detection means, and to generate a lockout signal to block a predetermined number of gate pulses from reaching either power module. And, a pulse counter program code counts a number of gate pulses intended for the second power module, and compares the number of gate pulses to the predetermined number of gate pulses.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically, such as when elements or features are embodied in program code. Thus, although schematics shown in the figures depict example arrangements of processing elements, additional intervening elements, devices, features, components, or code may be present in an actual embodiment.

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, diodes, look-up tables, etc., which may carry out a variety of functions under the control of one or more microprocessors or other control devices. Other embodiments may employ program code, or code in combination with other circuit components.

In accordance with the practices of persons skilled in the art of computer programming, the present disclosure may be described herein with reference to symbolic representations of operations that may be performed by various computing components, modules, or devices. Such operations may be referred to as being computer-executed, computerized, software-implemented, or computer-implemented. It will be appreciated that operations that can be symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

It has been discovered that, in order to produce a desired crossover delay between forward to reverse or reverse to forward that avoids the problems associated with prior systems, a gate firing pulse counter may be utilized as opposed to a fixed time delay. As previously described, when a crossover delay is generated from a fixed time delay, problems can still arise when a firing angle would change. A change in firing angle is a momentary change that can shift the entire gate pulse pattern either earlier or later in time during normal drive regulation, which makes it more difficult to block pulses at the crossover point. The fixed time delay could end up re-enabling the delivery of gate pulses in the middle of the gate pulse, thus resulting in an in-sufficient amount of gating energy being passed to a gate in the power module, which would likely result in a power module fault, (power component failure).

The inventors have found that by using the gate firing patterns as an input for control of the crossover delay, the complicated problem of coordinating the regulator gate pulse firing with the crossover delay can be avoided. This allows embodiments of the crossover delay implementation described herein to be independent of the drive regulator, thus simplifying the overall topology of the drive system. Because of the simplified configuration, the novel crossover delay embodiments described herein do not require special considerations whether connecting to a 50 Hz or 60 Hz power system. The crossover delay configurations are self adjusting to the line frequency that the regulator is using because the regulator produces the gate pulses, and the crossover delay is "counting" the gate pulses. This is especially beneficial for retrofit applications, and in applications with wide frequency variations such as those supplied by alternator power.

The crossover delay embodiments presented herein reshapes typical burst firing patterns from a regulator into single pulses, and the delay is established by counting these single pulses. This ensures that when the gate pulses to a given power module are once again enabled, the power module receives the complete gate firing pattern of pulses.

SCR Bridge Firing Topology

Figure 1:
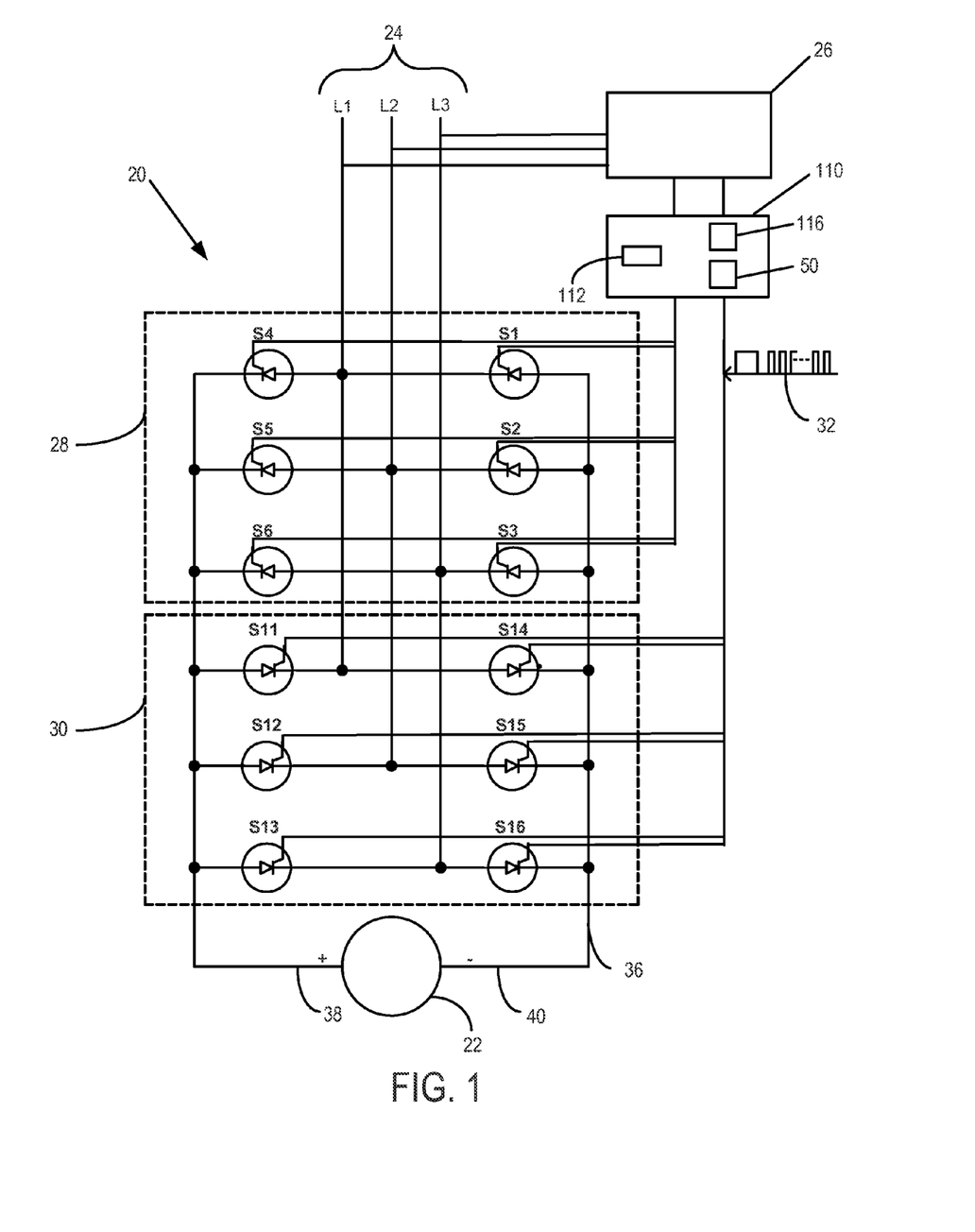
FIG. 1 is a circuit diagram of two six-pulse power modules (bridge rectifier circuits) connected to a three phase power source and connected in an anti-parallel configuration to provide both forward and reverse capabilities.

Turning now to the drawings, and referring initially to FIG. 1, an exemplary motor drive configuration 20 is illustrated for providing direct current (DC) electric power to a DC electric motor 22 as is known in the art. The drive configuration 20 is shown in an anti-parallel configuration to provide both forward and reverse capabilities of the motor 22. Electric power is provided to the drive configuration 20 from a three phase AC input power source 24 comprising AC power source lines L1, L2, and L3. Three phase AC power from the input power source 24 is provided to a regulator 26. The regulator 26 provides gate firing pulses 32 to a forward power module 28 and a reverse power module 30. Each power module is shown to include six switching elements. The forward power module 28 includes switching elements S1, S2, S3, S4, S5, and S6, which may be selectively actuated by the gate pulses 32 from the regulator 26 in a known manner. The reverse power module 30 includes switching elements S7, S8, S9, S10, S11, and S12, which may also be selectively actuated by the gate pulses 32 from the regulator 26 in a known manner. The switching elements may be of any known thyristor devices, such as an SCR, for example. Power modules are also known in the art as bridge rectifiers or SCR bridges, for example.

When selectively actuated by the regulator 26, either the forward power module 28 or the reverse power module 30 generate DC power on a DC bus 36 having a positive DC current path 38 and a negative DC current path 40 in a manner known in the art. Forward DC power, or reverse DC power, from the bus 36 is then applied to the motor 22 in a manner known in the art in order to provide DC power of appropriate amplitude and phase to the motor 22 in a controlled fashion. In this context, forward is used interchangeably with motoring, and reverse is used interchangeably with regenerative.

A crossover delay module 110 comprising crossover delay logic 50 may be integrated into the regulator 26 to be used with a drive system, or the crossover delay module 110 may comprise a stand alone device or program code, as shown in FIG. 1. The crossover delay module can be added downstream of the regulator 26, without changing the regulator. In one embodiment, the crossover delay logic 50 may be implemented in an FPGA in the regulator 26 or the crossover delay module 110. The crossover delay logic 50 may be used for newly configured systems, as well as to upgrade existing systems.

The ability of the crossover delay module to interface to a wide range of DC drive regulators 26 allows the crossover delay logic 50 to be applied to field installations that have been difficult to stabilize because of faults between the forward and reverse power modules during the crossover. By adding the crossover delay logic 50 to the drive system, a straightforward hardware and/or software solution can be applied to avoid changes to proprietary drive regulator software. It is likely a more preferred and economical solution to add a crossover delay module than to continue to "tweak" existing regulator software in an attempt to resolve crossover issues.

The gate firing pulse sequence for the switching elements are governed by the line phase rotation of the input power source 24. The actual firing point of the switching elements is determined by line synchronization circuits (not shown) and the closed-loop regulator gate pulses 32. Shown below in Table 1 is an exemplary firing sequence for forward phase rotation. Table 2 shows an exemplary firing sequence for reverse phase rotation.

TABLE 1

Phase Sequence and Switch Firing Order, Sequence L1, L2, L3

| AC Line Pairs | | |
|---|---|---|
| + | − | Gated Pairs |
| L1 | L3 | S4 & S3 |
| L2 | L3 | S5 & S3 |
| L2 | L1 | S5 & S1 |
| L3 | L1 | S6 & S1 |
| L3 | L2 | S6 & S2 |
| L1 | L2 | S4 & S2 |

TABLE 2

Phase Sequence and Switch Firing Order, Sequence L3, L2, L1

| AC Line Pairs | | |
|---|---|---|
| + | − | Gated Pairs |
| L1 | L2 | S4 & S2 |
| L3 | L2 | S6 & S2 |
| L3 | L1 | S6 & S1 |
| L2 | L1 | S5 & S1 |
| L2 | L3 | S5 & S3 |
| L1 | L3 | S4 & S3 |

Figure 2:
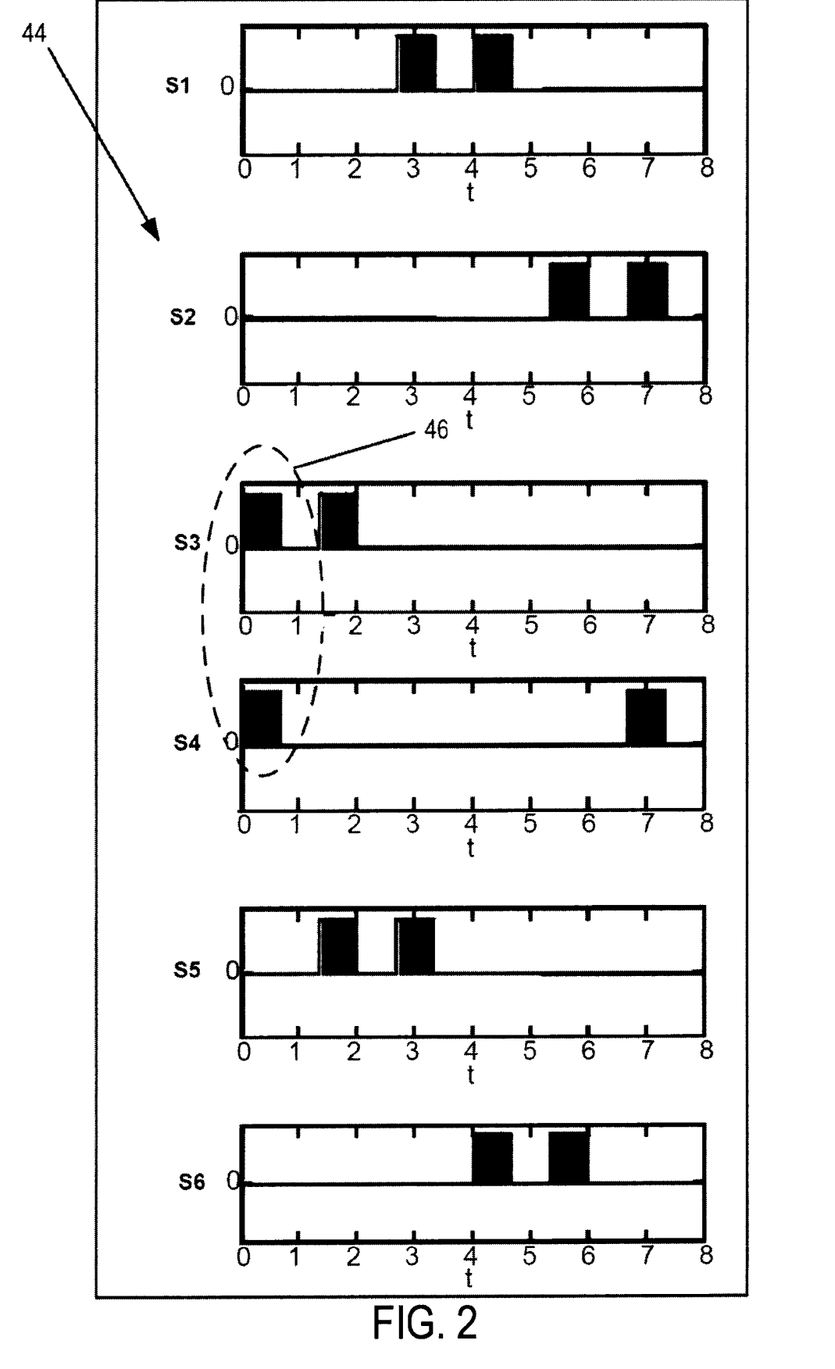
FIG. 2 is a graph showing firing pulses for positive phase rotation for the forward power module circuit shown in FIG. 1.

Referring to FIG. 2, exemplary gate firing pulses 44 can be seen for the forward phase rotation for the forward power module 28 shown in FIG. 1. As can be seen, the switching elements fire in gated pairs 46, as shown in Tables 1 and 2. For example, switching element S4 fires on the left side of the forward power module 28, and at the same time, switching element S3 fires on the right side of the forward power module 28 to provide a return path for the current. The firing pattern for the reverse power module 30 operates in the same fashion, except that the power output leads are connected in an anti-parallel configuration to the forward power module 28 to provide the reverse polarity to the motor 22.

Crossover Delay

Figure 3:
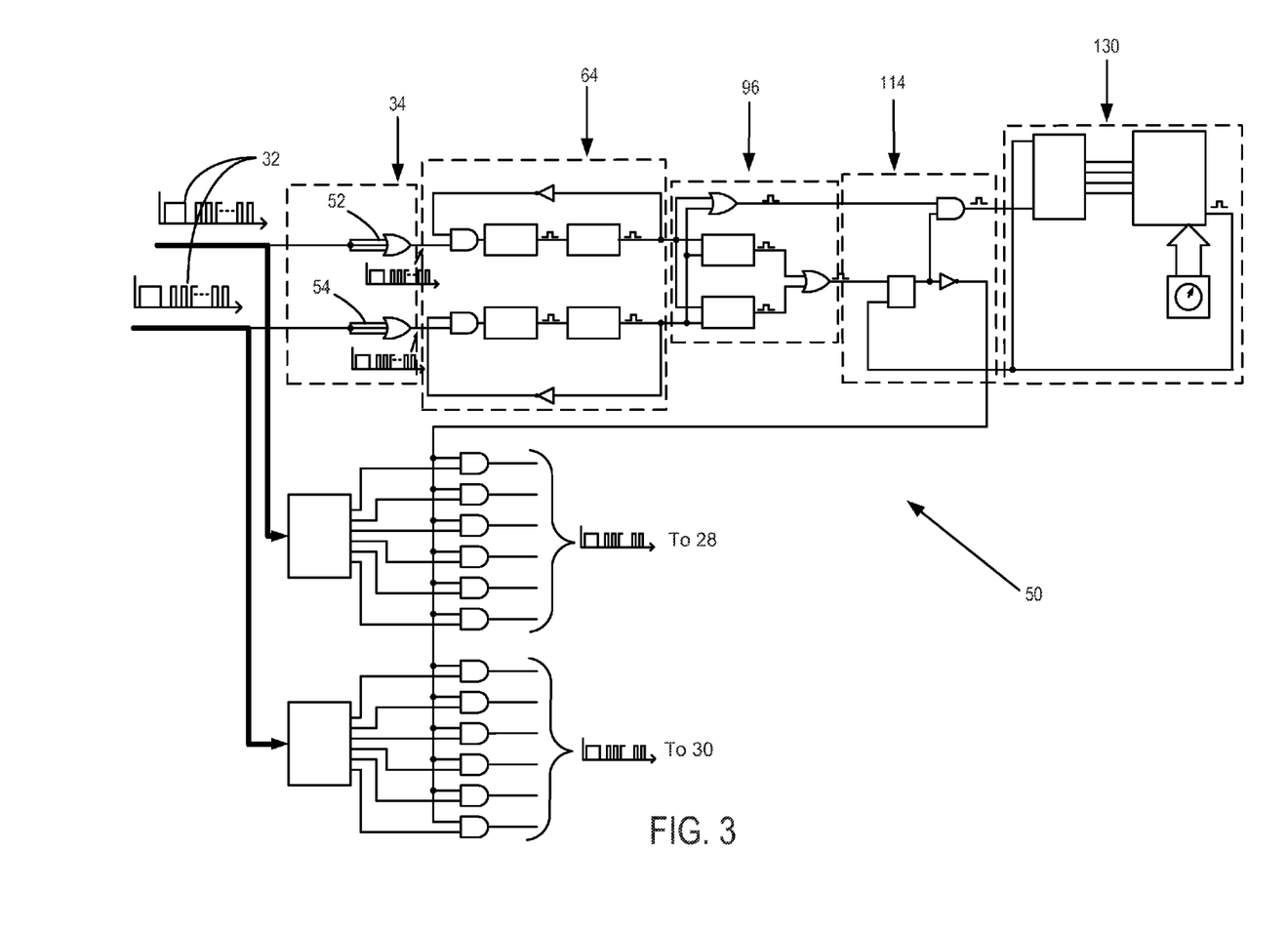
FIG. 3 is a block diagram showing an embodiment of a crossover delay implementation according to the invention.

FIG. 3 shows a block diagram of an embodiment of the crossover delay logic 50 as defined by the present invention. Functional sections of the block diagram will be shown and discussed in relation to FIGS. 4 through 9. The functional sections coupled together are envisioned in both system and method embodiments capable of being implemented in both hardware and software, and can include gate firing pulse logic 34, pulse conversion logic 64, crossover detection logic 96, lockout logic 114, and pulse counter logic 130. It is to be appreciated that the block diagram of the crossover delay logic represents a system design, rather than an actual hardware installation.

The crossover delay configuration of FIG. 3 functions to block the gate firing pulses 32 coming from the regulator 26 to prevent a short circuit between the forward and reverse power modules. In some retrofit situations, the turn-off time of the older power module technology may be longer than newer modules. If the drive is making the transition from forward to reverse, or reverse to forward, and the current from the power module has not totally shut off before the next power module turns on, a short circuit will occur between the power modules. The crossover delay provides dead time at the time of the transition by blocking the gate firing pulses 32 to the power modules.

Gate Firing Pulses

Figure 4:
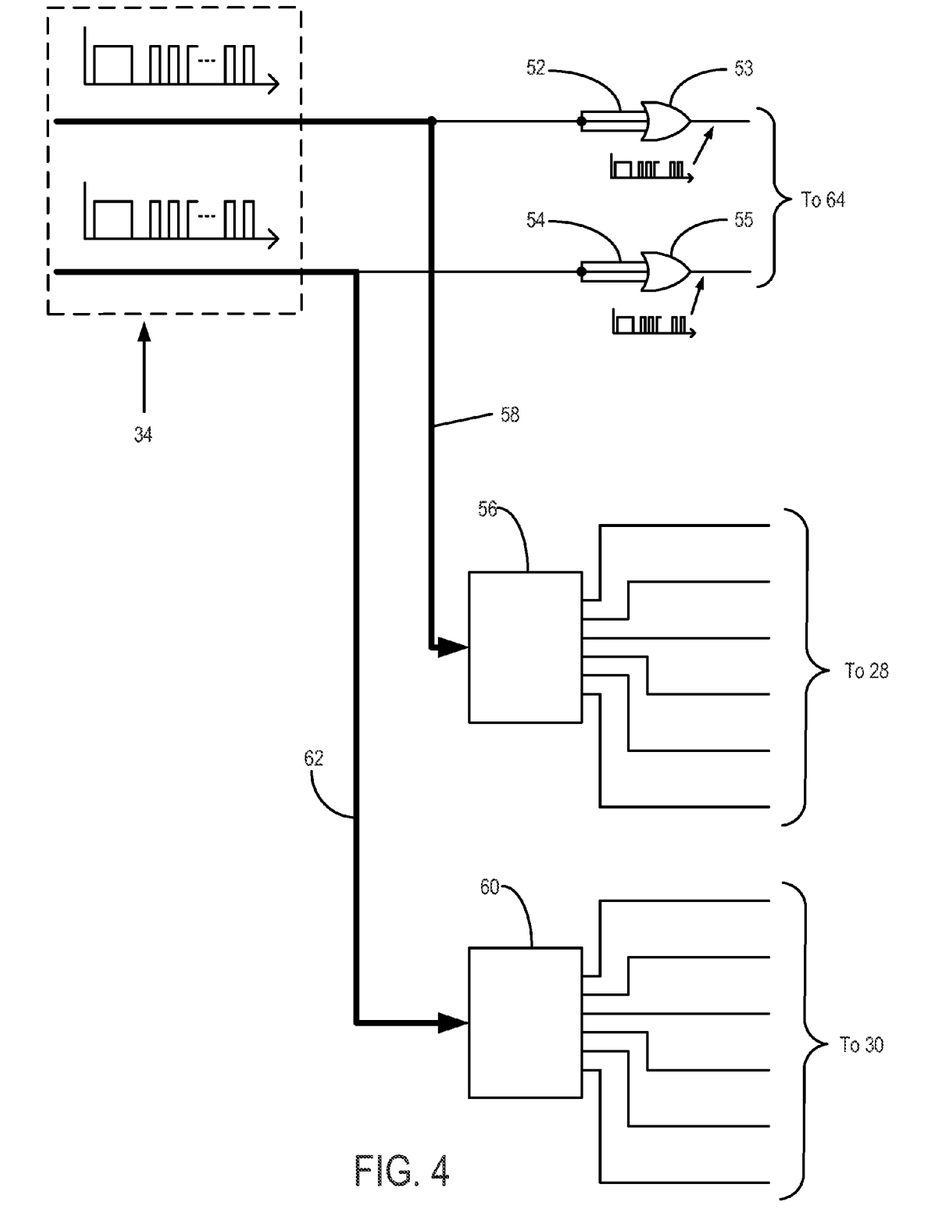
FIG. 4 is a section of the block diagram of FIG. 3 showing gate pulses to the crossover delay logic.

Referring to the gate firing pulse logic 34 shown in FIG. 4, the fact that the switching elements S1-S6, for example, fire in pairs reduces the amount of pulses 32 from the regulator that need to be processed for the crossover delay logic 50. The crossover delay logic may sense if the regulator 26 is in a "forward" or "reverse" state. Since the switching elements are always fired in pairs, only three forward gate signals 52 and three reverse gate signals 54 may be processed to sense forward versus reverse states of operation. In an alternative embodiment, more or less than three forward and three reverse gate signals are processed. In one embodiment, a forward OR gate 53 processes the three forward gate signals 52, and a reverse OR gate 55 processes the three reverse gate signals 54.

As discussed above, the switching elements are fired in pairs. Therefore, in one embodiment, only half of the incoming gate firing pulses may be monitored for an implementation of the crossover delay logic. The crossover delay logic 50 needs a finite amount of time to process the gate firing signals 52 or 54 to determine forward versus reverse states of operation. To allow for this time, a predetermined forward delay 56 may be added to the six forward pulse trains 58 and a predetermined reverse delay 60 may be added to the six reverse pulse trains 62. The actual time of each delay may depend on the overall execution speed of the crossover delay logic 50. In one embodiment, both delays 56 and 60 may range from about 0.01 µSec to about 1.0 µSec, and may be about 0.1 µSec, or more or less, based on impact to the drive configuration 20.

Pulse Conversion Logic

Figure 5:
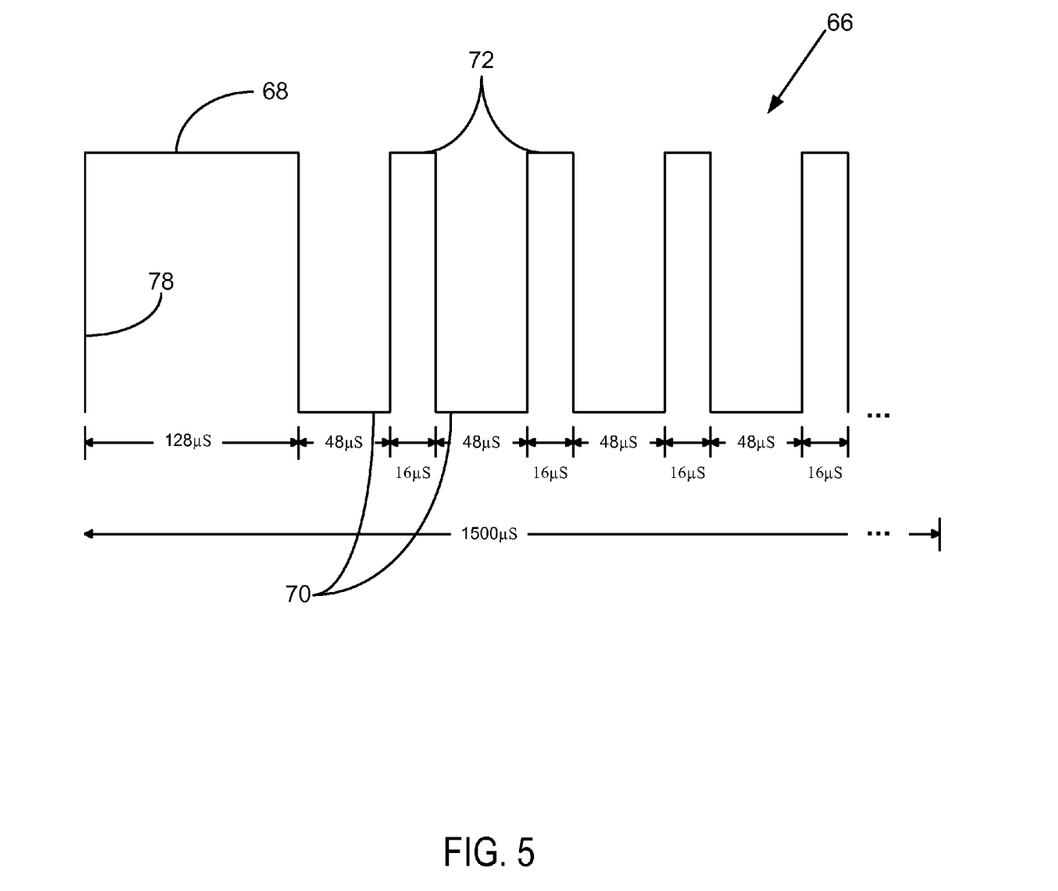
FIG. 5 is a timing chart showing an embodiment of a gate pulse burst firing pattern, the gate pulse coming in the form of a burst gate firing pattern series of pulses.
Figure 6:
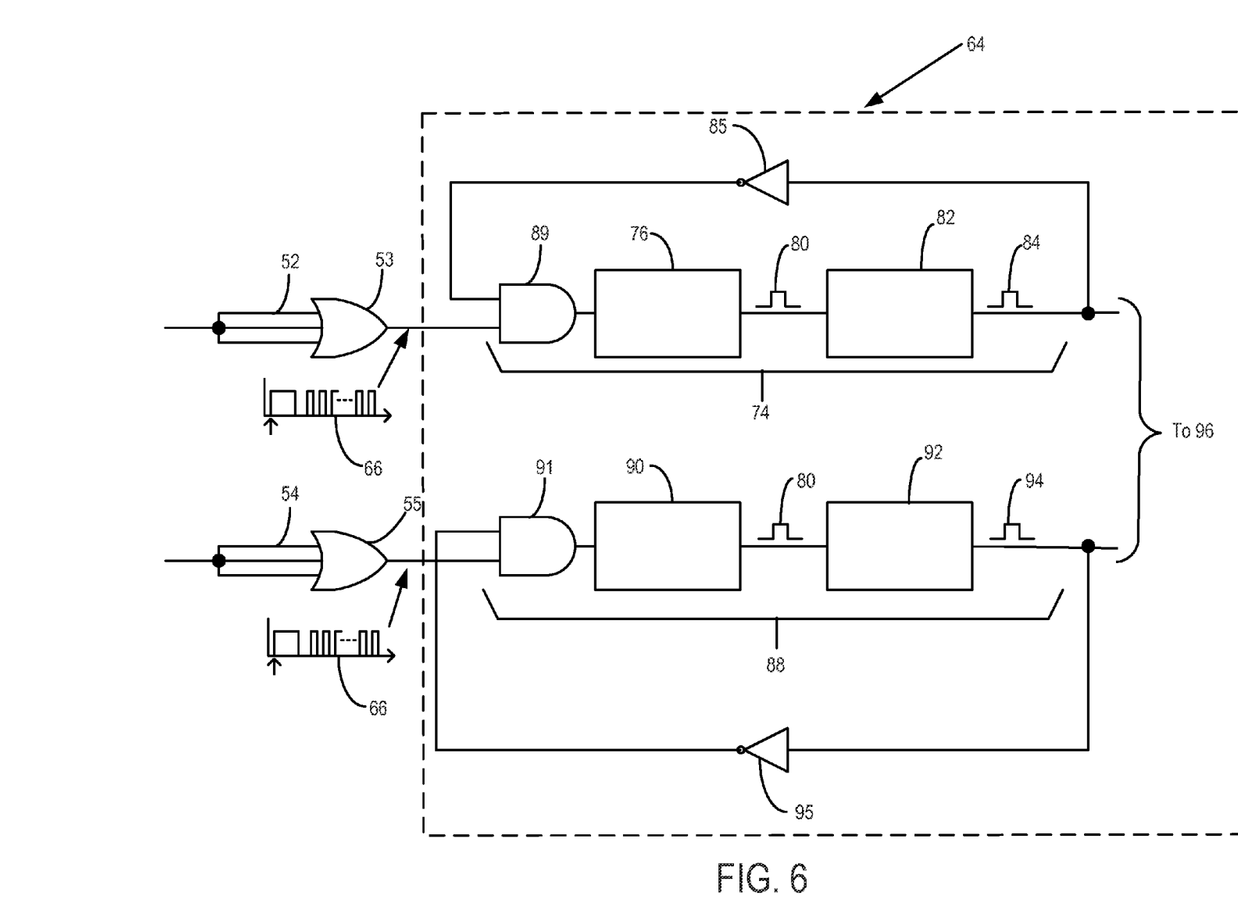
FIG. 6 is a section of the block diagram of FIG. 3 showing the burst to single pulse converter for both forward and reverse circuits.

Referring to FIGS. 5 and 6, the forward and reverse gate firing pulses typically come in the form of pulses in a burst pattern. To simplify the crossover delay detection logic discussed below, in one embodiment, each burst pattern may be converted to a single pulse using pulse conversion logic 64. One non-limiting example of burst pattern 66 is shown in FIG. 5. The burst pattern is shown to be initially on for 128 µSec. at 68, and then repeats an off-on pattern twenty-two times, the pattern consisting of off for 48 µSec. at 70 and on for 16 µSec. at 72. In one embodiment, the total burst pattern has a duration of approximately 1.5 mSec., although longer or shorter burst pattern durations are contemplated. In one embodiment, the length of the resulting processed single pulse 84 may span the entire duration of the pulse burst pattern 66. For a 60 Hz line, the burst pattern repeats twice every 16.67 mSec., and for a 50 Hz line, the burst pattern repeats twice every 20.00 mSec.

Referring to FIG. 6, the pulse conversion logic 64 may include a forward pulse converter 74 and a reverse pulse converter 88. The forward pulse converter 74 includes a forward edge trigger 76 that triggers on the positive going edge 78 of the first pulse 68 in the burst pattern 66, and generates a short pulse 80. The short pulse 80 may range in pulse time, and in one embodiment is a 0.05 µSec. pulse, although it is to be appreciated that the short pulse time may be larger, or may be a much shorter pulse time, such as between about 1.0 mSec. and 0.001 µSec., for example. The short pulse 80 triggers a forward pulse stretcher timer 82. In one embodiment, the pulse stretcher timer 82 is configured to generate a single 2.2 mSec. processed forward pulse 84 to ensure that its duration exceeds that entire length of each gate firing burst pattern 66, although it is to be appreciated that shorter and larger processed pulses 84 are contemplated and considered part of the invention. The 2.2 mSec. pulses 84 may then be used as clock pulses in the coupled downstream logic. In one embodiment, a NOT gate 85 coupled to forward AND gate 89 block the remainder of the burst firing pattern when pulse 84 is present.

A reverse pulse converter 88 operates in the same manner as the forward pulse converter 74, and includes a reverse edge trigger 90, a reverse pulse stretcher timer 92, and generates a 2.2 mSec. processed reverse pulse 94. Similarly, a NOT gate 95 coupled to reverse AND gate 91 blocks the remainder of the burst firing pattern when processed pulse 94 is present.

Once the pulse stretcher timer 82 or 92 is enabled, further pulses from the burst pattern 66 are blocked and the resultant output is the 2.2 mSec. pulse 84 or 94 for each burst pattern 66. This pulse conversion logic 64 is operable and/or adaptable to a variety of manufacturers DC drive regulators. It may also be independent of line frequency.

Crossover Detection and Lockout Logic

Figure 7:
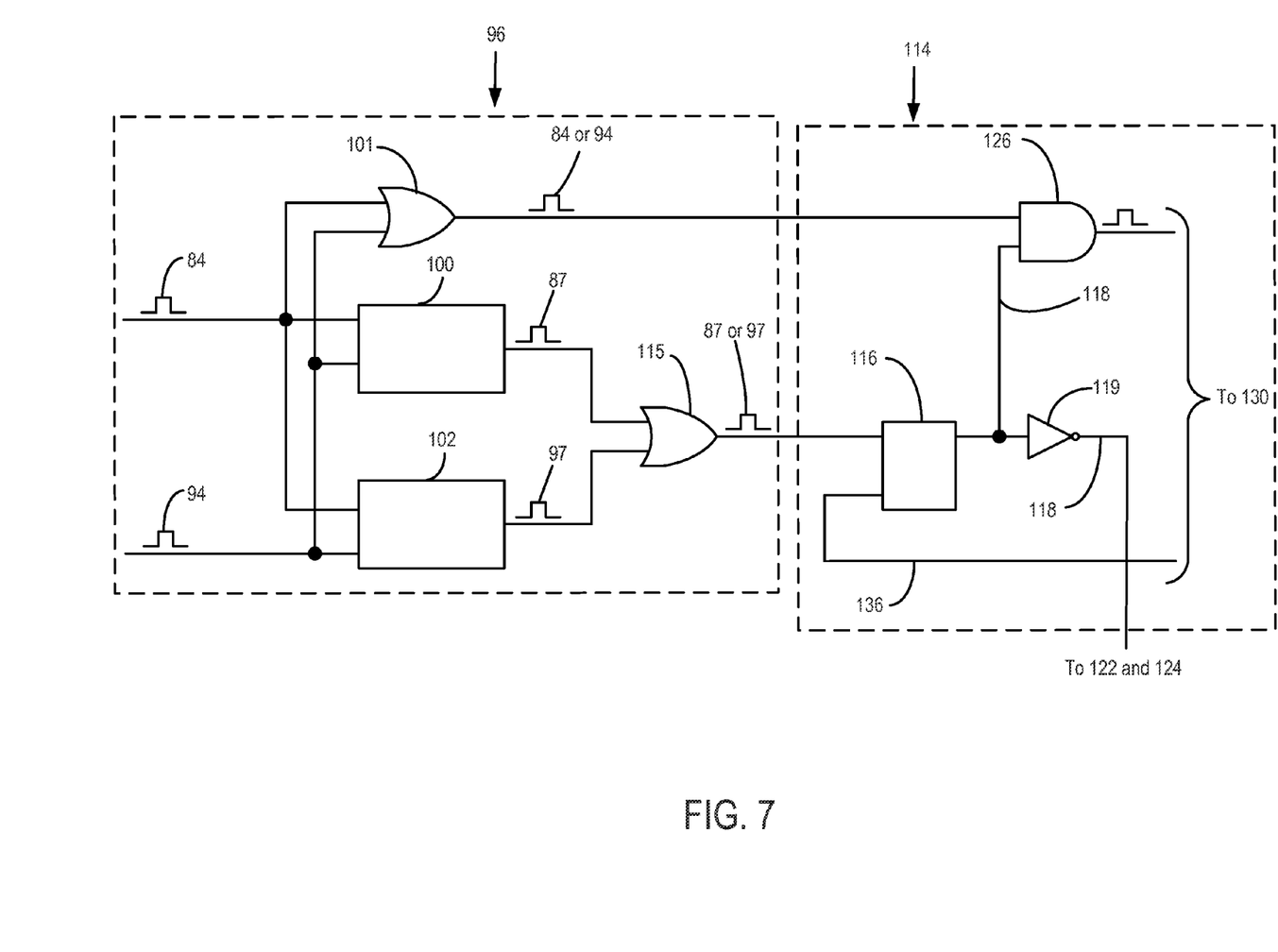
FIG. 7 is a section of the block diagram of FIG. 3 showing crossover detection logic that detects a forward to reverse transition or a reverse to forward transition.

FIG. 7 shows the crossover detection logic 96 where the stream of 2.2 mSec. forward pulses 84, and the stream of 2.2 mSec reverse pulses 94 are fed to a forward to reverse transition detector 100 and a reverse to forward transition detector 102. When a forward pulse 84 is followed by a reverse pulse 94, there is a forward to reverse transition. When a reverse pulse 94 is followed by a forward pulse 84, there is a reverse to forward transition. The forward pulses 84 and the reverse pulses 94 are also supplied to OR gate 101, which is coupled to the lockout logic 114. For either transition, all firing pulses need to be blocked for a predetermined number of pulses.

Figure 8:
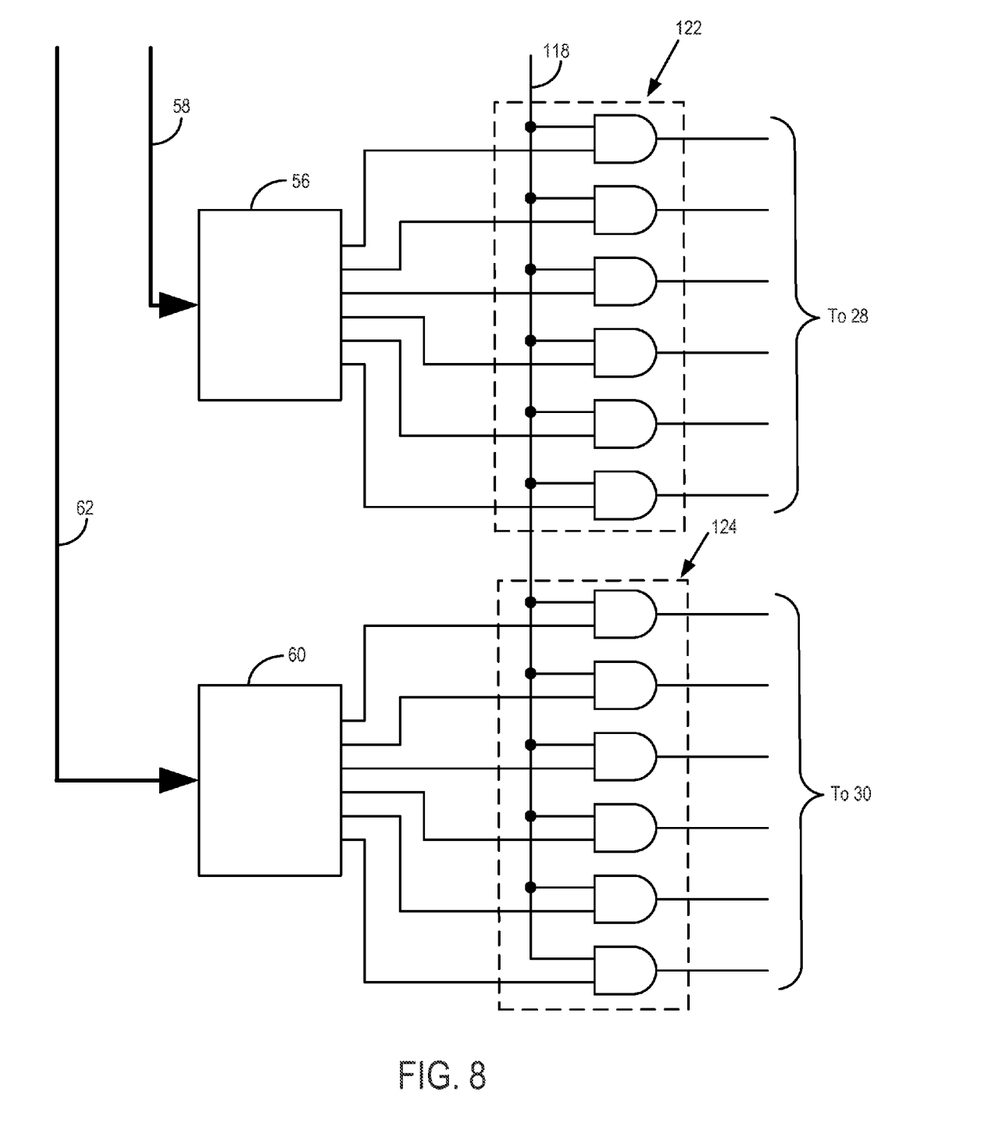
FIG. 8 is a section of the block diagram of FIG. 3 showing the forward AND gates and the reverse AND gates that are controlled by a lockout flip-flop.

When either a forward to reverse transition or a reverse to forward transition is detected, lockout logic 114 may be set. When the forward to reverse transition detector 100 detects a forward to reverse transition through the timing comparison of pulse 84 (forward) to pulse 94 (reverse), it produces a short pulse 87 for the lockout logic 114. Similarly, when the reverse to forward transition detector 102 detects a reverse to forward transition through the timing comparison of pulse 94 (reverse) to pulse 84 (forward), it also produces a short pulse 97 for the lockout logic. Both pulses 87 and 97 are applied to OR gate 115, which supplies either short pulse 87 or 97 to the lockout logic 114. In one embodiment, the lockout logic 114 includes a flip-flop 116, although other logic configurations are contemplated. The lockout logic 114 generates a lockout signal 118 that is fed to NOT gate 119. The lockout signal 118 is used to lock out all of the forward 58 and reverse gate pulses 62 through a series of forward AND gates 122 and a series of reverse AND gates 124. FIG. 8 shows the lockout signal 118 from the lockout circuit 114 used to control the forward AND gates 122 and the reverse AND gates 124.

Pulse Counter Logic

Figure 9:
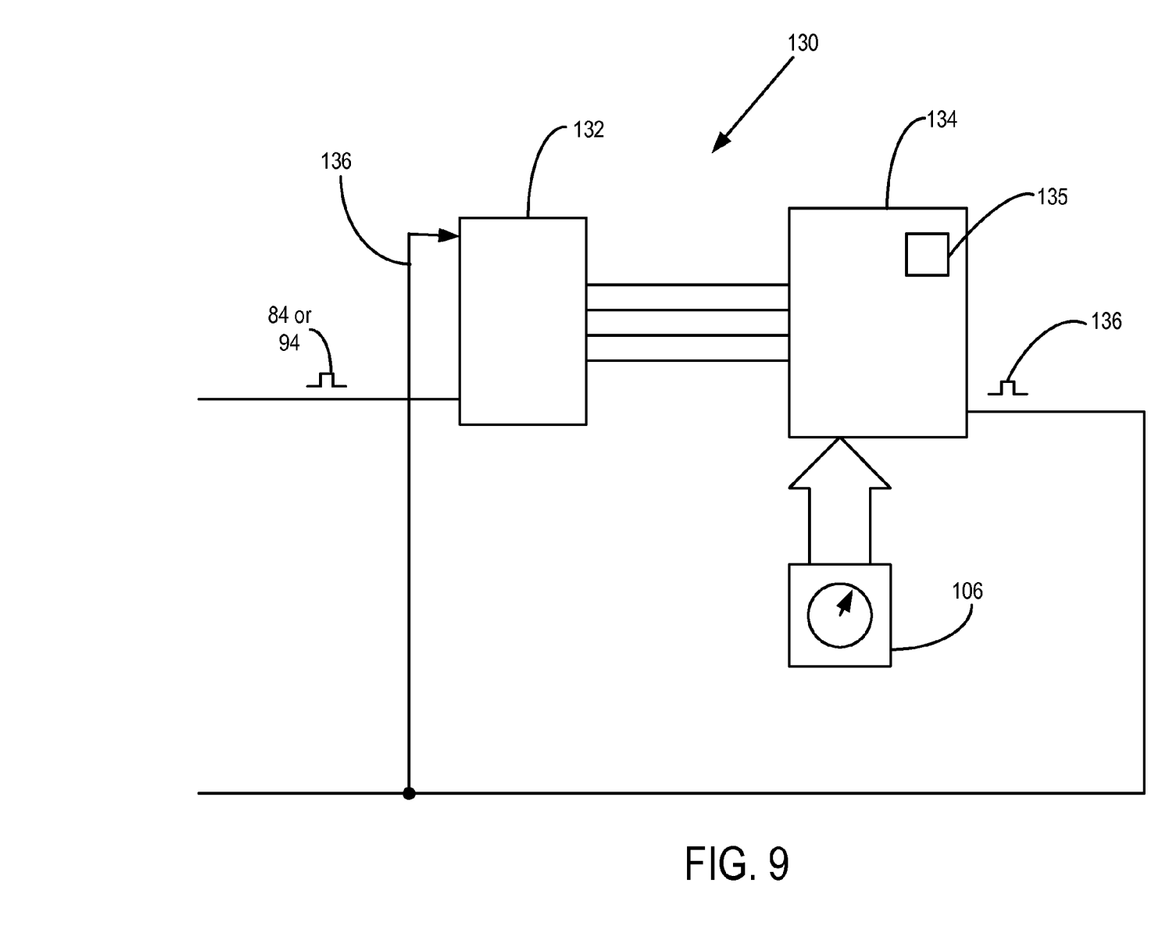
FIG. 9 is a section of the block diagram of FIG. 3 showing pulse counter logic.

When the flip-flop 116 in the lockout logic 114 is set, the lockout signal 118 is also fed to a lockout AND gate 126, which allows the forward 2.2 mSec. pulses 84 or the reverse 2.2 mSec. pulses 94 to the coupled downstream pulse counter logic 130. FIG. 9 shows an embodiment of the pulse counter logic 130 that may be coupled downstream of the lockout AND gate 126. A pulse counter 132 counts the number of processed pulses 84 or 94 that originate from either the forward pulse converter 74 or the reverse pulse converter 88. A comparator 134 compares the value from the counter 132 with the setting of the input switch 106. When a dead time count 135 (as determined by switch 106) is reached, the comparator 134 generates a reset pulse 136 so that the lockout circuitry 114 may be reset and ready for the next forward to reverse or reverse to forward transition. The reset pulse 136 may be applied to the pulse counter 132 and the flip-flop 116.

Input Switch

The predetermined number of pulses to be blocked may be fixed, or may be field adjustable by using the input switch 106 (see FIG. 9). In one embodiment, the input switch 106 is a BCD (Binary Coded Decimal) switch, such as a four bit BCD input switch. In one embodiment, the pulse counter 132 and the comparator 134 may be four bit devices to match the input switch 106. The input switch 106 may be conveniently accessible on the regulator 26, or on the crossover delay module 110, for example.

In one embodiment, the input switch 106 may be used to drive LEDs 112 on the regulator 26, or module 110, or on a printed circuit board (not shown). In one embodiment, the LEDs 112 reflect the binary pattern of the switch position. The LEDs are a useful troubleshooting tool as they reflect what the module 110 thinks the switch positions are in. In one embodiment, the LEDs 112 may be visible through the regulator or module housing. The LEDs can be observed to count up in a binary fashion when the switch 106 is moved through available positions, e.g., from position 0 through 9. Alternatively, logic could be added to drive a digital display for direct readout of the BCD switch setting.

Simulation Graph

Figure 10:
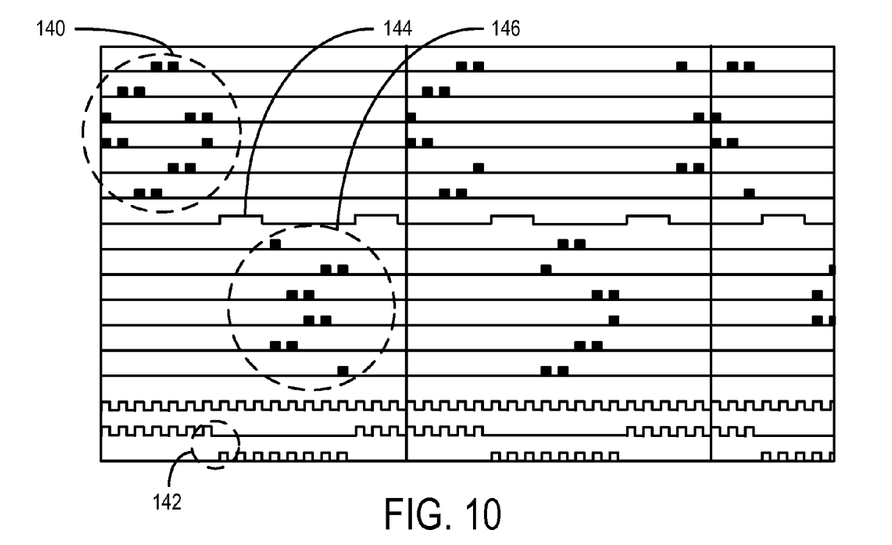
FIG. 10 is a timing chart showing a stream of burst pattern pulses for the circuit shown in FIG. 1 including alternating between a forward and a reverse drive state so as to show the crossover delay.
Figure 11:
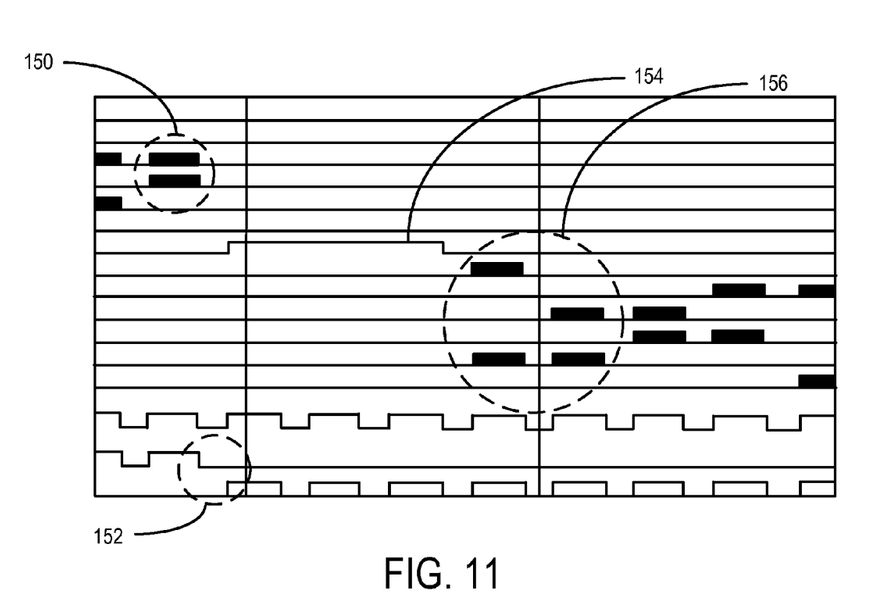
FIG. 11 is a magnified view of a transition from reverse to forward and the added crossover delay.

FIGS. 10 and 11 show simulation graphs to identify a crossover between a forward and a reverse drive state. A stream of burst pattern pulses are shown for a six-pulse power module firing pattern. FIG. 10 is representative of a drive configuration set up to alternate between a forward and a reverse drive state. In this way the crossover can be shown. FIG. 11 is a magnified view of one transition from reverse to forward. As seen in FIG. 10, the graph shows reverse gate firing pulses 140 indicating the motor is in a reverse condition. Upon the first forward gate pulse indicated at 142, the lockout circuit is activated at 144, and the forward gate pulses are blocked for a dead time count of three, for this example. As soon as the counter reaches the dead time count, the reset pulse 136 is generated and the lockout logic 114 is reset, allowing the forward pulses to the forward power module, as indicated at 146. FIG. 10 shows multiple transitions from reverse to forward and forward to reverse.

FIG. 11 shows a magnified view of the first transition from reverse to forward as seen in FIG. 10. The reverse gate firing pulses 150 indicate the motor is in a reverse condition. Upon the first forward gate pulse indicated at 152, the lockout logic is activated at 154, and the forward gate pulses are blocked for the dead time count of three. As soon as the counter reaches the dead time count, the reset pulse 136 is generated and the lockout logic is reset, allowing the forward pulses to the forward power module, as indicated at 156.

In one embodiment, the crossover delay logic 50 can be adjusted while the drive is running. Tables 3 and 4 below indicate the length in time of the crossover delay based on the setting of the input switch 106. For example, a user may start out with a low value on the input switch, such as 1, 2 or 3 and see if that is sufficient to eliminate the current spikes. For each increment on the input switch 106, a pair of firing pulses is eliminated. As the switch setting is increased, drive stability and performance will be affected.

TABLE 3

Cross-Over Delay, 60 Hz Operation (each count = 60 Deg):

| |
| --- |
| 0 = 0 × 2.78 mSec = 0.00 mSec |
| 1 = 1 × 2.78 mSec = 2.78 mSec |
| 2 = 2 × 2.78 mSec = 5.56 mSec |
| 3 = 3 × 2.78 mSec = 8.34 mSec |
| 4 = 4 × 2.78 mSec = 11.12 mSec |
| 5 = 5 × 2.78 mSec = 13.90 mSec |
| 6 = 6 × 2.78 mSec = 16.68 mSec |
| 7 = 7 × 2.78 mSec = 19.46 mSec |
| 8 = 8 × 2.78 mSec = 22.24 mSec |
| 9 = 9 × 2.78 mSec = 25.02 mSec |

TABLE 4

Cross-Over Delay, 50 Hz Operation (each count = 60 Deg):

| |
| --- |
| 0 = 0 × 3.33 mSec = 0.00 mSec |
| 1 = 1 × 3.33 mSec = 3.33 mSec |
| 2 = 2 × 3.33 mSec = 6.66 mSec |
| 3 = 3 × 3.33 mSec = 9.99 mSec |
| 4 = 4 × 3.33 mSec = 13.32 mSec |
| 5 = 5 × 3.33 mSec = 16.65 mSec |
| 6 = 6 × 3.33 mSec = 19.98 mSec |
| 7 = 7 × 3.33 mSec = 23.31 mSec |
| 8 = 8 × 3.33 mSec = 26.64 mSec |
| 9 = 9 × 3.33 mSec = 29.97 mSec |

Experimental Results

Figure 12:
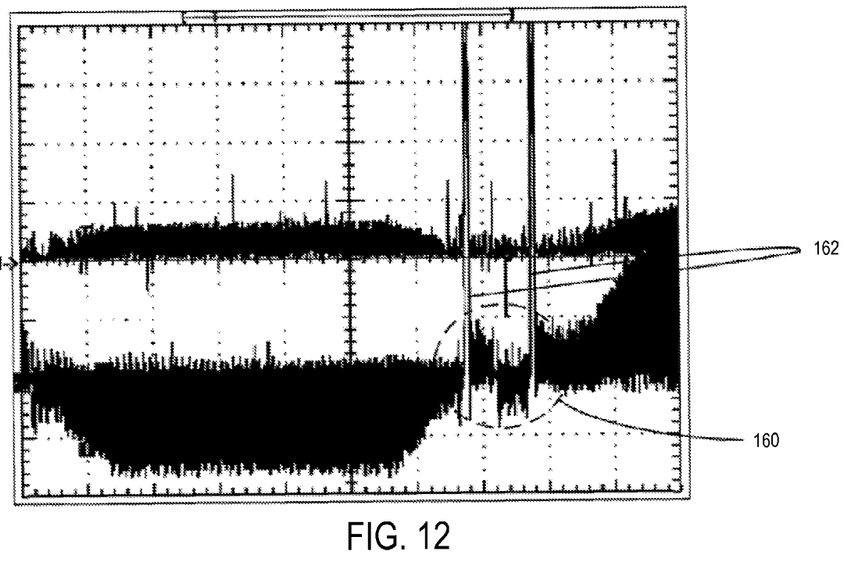
FIG. 12 is a graph showing an example of the shoot through problem at crossover, the lower trace being motor current, and showing the crossover spiking of current.

FIG. 12 shows an example of the shoot through problem at crossover 160. The shoot-through currents go to the maximum value of the scope trace. In this particular example, the line frequency=50 Hz, and the motor speed=1000 RPM. In this example, the crossover delay logic 50 is in the circuit, but essentially disabled, with the crossover delay on the switch 106 set to zero. The top trace is CT feedback, which is always in the positive direction. The lower trace is motor current, measured via a current probe. The small spikes are due to noise pick-up and the large spikes 162 are shoot-through currents showing that the crossover spiking of current is present.

Figure 13:
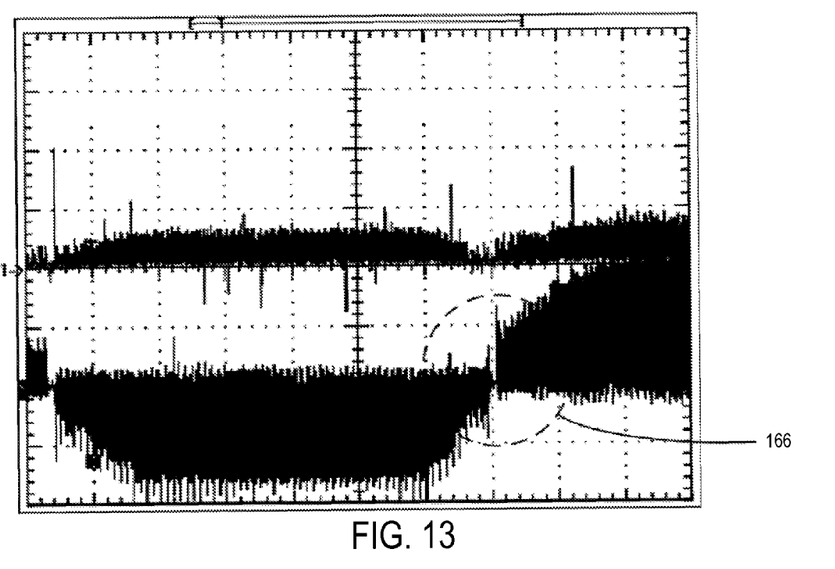
FIG. 13 is a graph similar to FIG. 12 except showing an example including a crossover delay according to an embodiment of the invention, the crossover delay eliminating the crossover spiking of current.

FIG. 13 shows an example where the crossover delay on the switch 106 is set to two. Again, the line frequency=50 Hz, and the motor speed=1000 RPM. In one example, at a setting of one, there were spikes, but the setting of two was sufficient to eliminate the spikes. The crossover delay can be seen at 166 where there is a period of zero current, showing that the crossover spiking of current appears to be gone.

Figure 14:
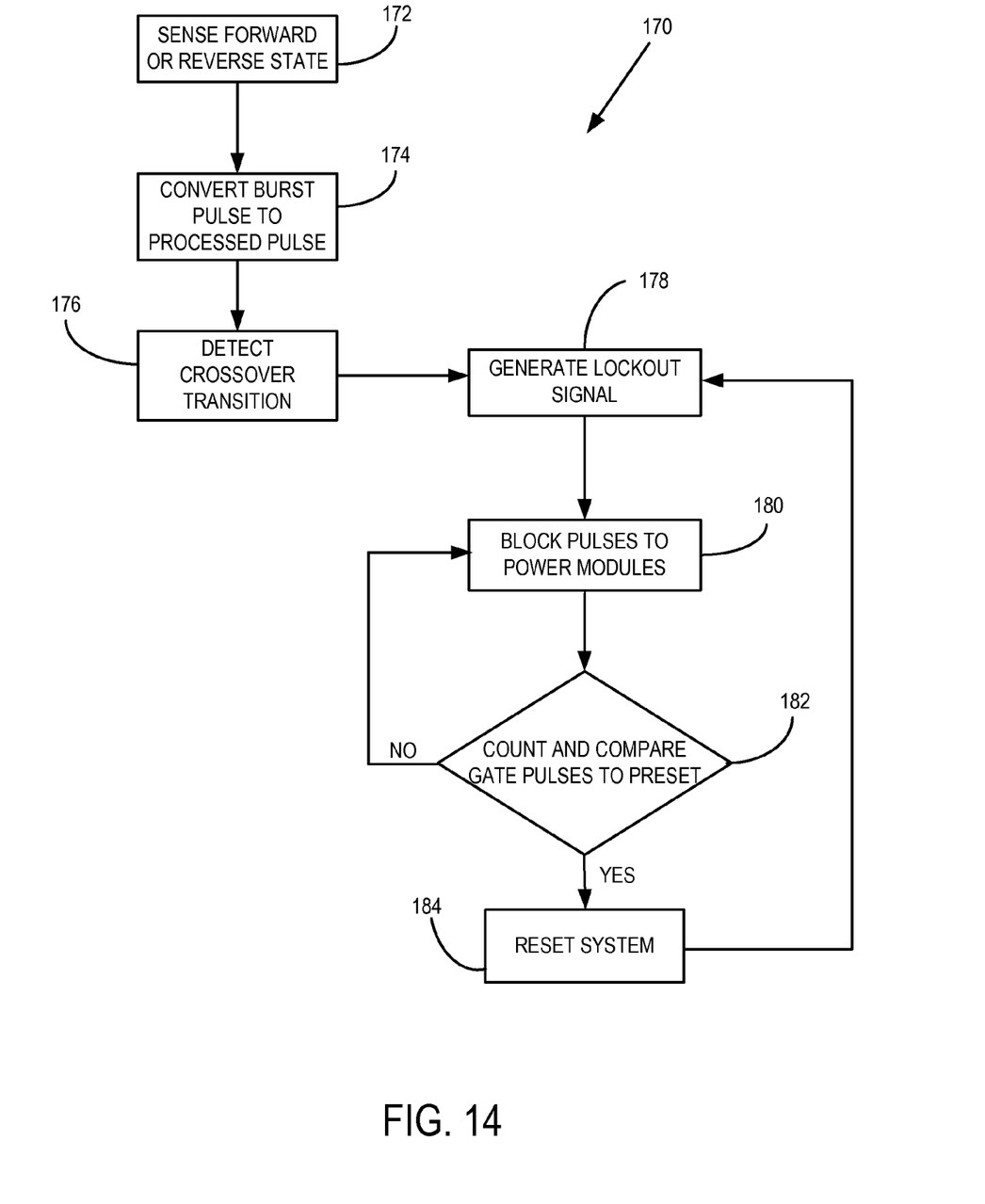
FIG. 14 is a flow chart illustrating a method that may be performed in accordance with embodiments of the block diagram illustrated in FIG. 3.

Referring now to FIG. 14, a method 170 that is consistent with embodiments of the block diagram illustrated in FIG. 3. is illustrated. At process block 172, the state of the drive is sensed by sensing gate pulses to a first power module, such as a forward power module, and gate pulses to a second power module, such as a reverse power module. At process block 174, burst pattern pulses to either of the first power module and to the second power module are converted to processed pulses. At process block 176, the processed pulses are used by a detection configuration for detecting when a transition from the first power module to the second power module, or from the second power module to the first power module is taking place. When the transition is detected, a lockout signal is generated at process block 178, and at process block 180, the lockout signal is used to block a predetermined number of gate pulses from reaching either power module. At decision block 182, the gate pulses intended for either power module are counted and compared to the predetermined number of gate pulses. At process block 184, a reset pulse is generated to reset the crossover delay system when the number of gate pulses equals the predetermined number of gate pulses.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. A crossover delay system for blocking gate firing pulses when a transition from a first power module to a second power module is taking place, the first power module is one of a forward power module for driving a motor in a first direction and a reverse power module for driving the motor in a second direction, the second power module is the other of the forward power module and the reverse power module, the system comprising:
a crossover detection means for detecting when the transition from the first power module to the second power module is taking place and generating a crossover detection pulse when the transition is detected;
a lockout means for receiving the crossover detection pulse from the crossover detection means, and generating a lockout signal to block a predetermined number of gate firing pulses from reaching the second power module when the lockout means receives the crossover detection pulse to prevent a short circuit between the first power module and the second power module, the gate firing pulses received from a regulator; and
a pulse counter means for counting a number of gate firing pulses intended for the second power module, and comparing the number of gate firing pulses to the predetermined number of gate firing pulses.

2. The system according to claim 1,
wherein when the number of gate firing pulses equals the predetermined number of gate firing pulses, the pulse counter means generates a reset pulse to reset the crossover delay system.

3. The system according to claim 1,
wherein the predetermined number of gate firing pulses is field adjustable.

4. The system according to claim 1,
wherein the first power module is one of a forward power module and a reverse power module, and the second power module is the other one of the forward power module and the reverse power module.

5. The system according to claim 1,
further including gate firing means for sensing gate firing pulses to the first power module and to the second power module.

6. The system according to claim 1,
further including a pulse conversion means, wherein the pulse conversion means includes a first power module pulse converter and a second power module pulse converter, the first power module pulse converter operable to generate a first power module processed pulse, and the second power module pulse converter operable to generate a second power module processed pulse.

7. The system according to claim 6,
wherein the first power module processed pulse has an individual width that is longer than each individual gate firing pulse to the first power module, and the second power module processed pulse has an individual width that is longer than each individual gate firing pulse to the second power module.

8. The system according to claim 1,
further including a drive system, the drive system operable to generate the gate firing pulses to the first power module and to the second power module, the crossover delay system being adjustable while the drive system is running.

9. The system according to claim 8,
wherein the drive system operates at a line frequency, and the crossover delay system is self adjusting to the line frequency.

10. A method for blocking gate firing pulses to power modules received from a regulator, the method comprising:
detecting when a transition from a first power module to a second power module is taking place, the first power module is one of a forward power module for driving a motor in a first direction and a reverse power module for driving the motor in a second direction, the second power module is the other of the forward power module and the reverse power module;
generating a lockout signal when the transition is detected; and
blocking a predetermined number of gate firing pulses from reaching the second power module, to prevent a short circuit between the first power module and the second power module.

11. The method according to claim 10,
further including generating a crossover detection pulse when the transition from the first power module to the second power module is taking place, and applying the crossover detection pulse to a lockout logic to generate the lockout signal.

12. The method according to claim 10,
further including counting a number of gate firing pulses intended for the second power module; and
comparing the number of gate firing pulses to the predetermined number of gate firing pulses.

13. The method according to claim 10,
generating a reset pulse to reset the crossover delay system when the number of gate firing pulses equals the predetermined number of gate firing pulses.

14. The method according to claim 10,
further including adjusting the predetermined number of gate firing pulses.

15. The method according to claim 10,
further including sensing gate firing pulses to the first power module and to the second power module.

16. The method according to claim 10,
wherein, after the crossover delay system is reset, the first firing gate pulse the second power module receives is a complete gate firing pulse.

17. The method according to claim 10,
further including adding a predetermined time delay to the gate firing pulses to the first power module, and adding a predetermined time delay to the gate firing pulses to the second power module.

18. A non-transitory computer readable medium and a computer readable code embodied on the non-transitory computer readable medium for use with a motor drive system that includes at least a first power module and a second power module, the first power module is one of a forward power module for driving a motor in a first direction and a reverse power module for driving the motor in a second direction, the second power module is the other of the forward power module and the reverse power module, the computer readable code comprising:
a crossover detection program code configured to detect when the transition from the first power module to the second power module is taking place and to generate a crossover detection pulse when the transition is detected;

a lockout program code configured to receive the crossover detection pulse from the crossover detection means, and generate a lockout signal to block a predetermined number of gate firing pulses from reaching the second power module when the lockout program code receives the crossover detection pulse to prevent a short circuit between the first power module and the second power module; and a pulse counter program code to count a number of gate firing pulses intended for the second power module, and comparing the number of gate firing pulses to the predetermined number of gate firing pulses.

* * * * *